United States Patent [19]
Parulski et al.

[11] Patent Number: 5,475,441
[45] Date of Patent: Dec. 12, 1995

[54] ELECTRONIC CAMERA WITH MEMORY CARD INTERFACE TO A COMPUTER

[75] Inventors: Kenneth Parulski; Raymond J. Bouvy, both of Rochester; Timothy J. Tredwell, Fairport; David A. Smith, Rochester, all of N.Y.

[73] Assignee: Eastman Kodak Company, Rochester, N.Y.

[21] Appl. No.: 988,517

[22] Filed: Dec. 10, 1992

[51] Int. Cl.⁶ ........................................... H04N 5/30
[52] U.S. Cl. ..................... 348/552; 348/207; 348/158
[58] Field of Search ................. 358/209, 41; 354/412; 348/207, 552, 158; 395/425; H04N 5/30

[56] References Cited

U.S. PATENT DOCUMENTS

| | | | |
|---|---|---|---|
| 4,714,962 | 12/1987 | Levine | 358/209 |
| 4,751,583 | 6/1988 | Levine | 358/256 |
| 4,827,347 | 5/1989 | Bell | 358/224 |
| 4,937,676 | 6/1990 | Finelli | 358/229 |
| 5,016,107 | 5/1991 | Sasson et al. | 358/209 |
| 5,034,804 | 7/1991 | Sasaki et al. | 358/41 |
| 5,231,501 | 7/1993 | Sakai | 358/209 |
| 5,260,795 | 11/1993 | Sakai et al. | 358/209 |

OTHER PUBLICATIONS

U.S. patent application 07/938,573; filed Aug. 31, 1992; entitled "Hand–Manipulated Electronic Camera Tethered to a Personal Computer"; Inventors: John J. Acello, Robert H. Hamel; Kenneth Parulski.

Primary Examiner—Michael T. Razavi
Assistant Examiner—Andy Christensen
Attorney, Agent, or Firm—David M. Woods

[57] ABSTRACT

An electronic camera operates with a small, portable computer having a card interface of the type used for communicating with a removable memory card. The camera includes an image sensor for converting an image into an electrical signal, an A/D converter for converting the electrical signal into a digital signal, and a signal processor for interfacing the digital signal to the card interface, ordinarily a slot receptacle, on the computer. By defining the interface to include a mechanical extender that physically interconnects the camera to the card slot on the computer, the camera and computer are linked in a high speed interface as a convenient, hand-held unit.

10 Claims, 5 Drawing Sheets

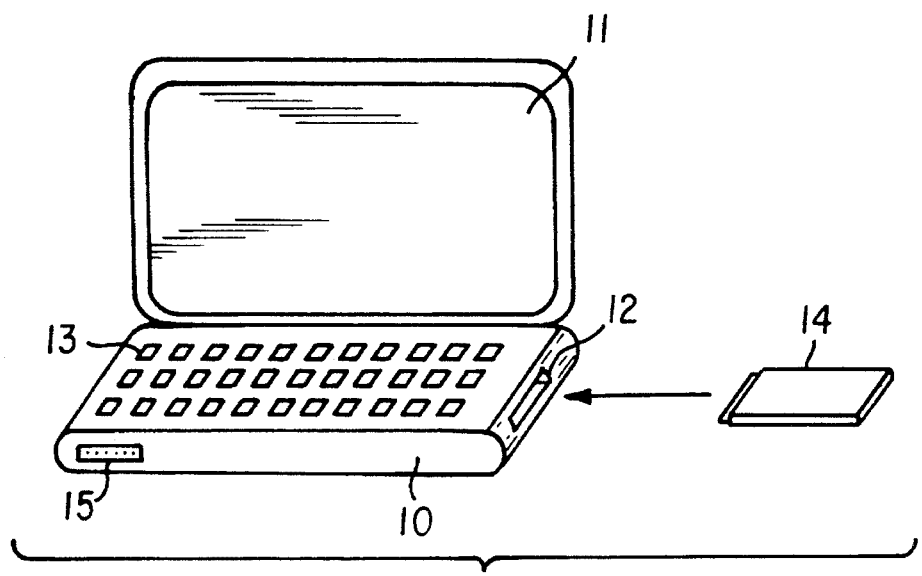
FIG. 1
(prior art)
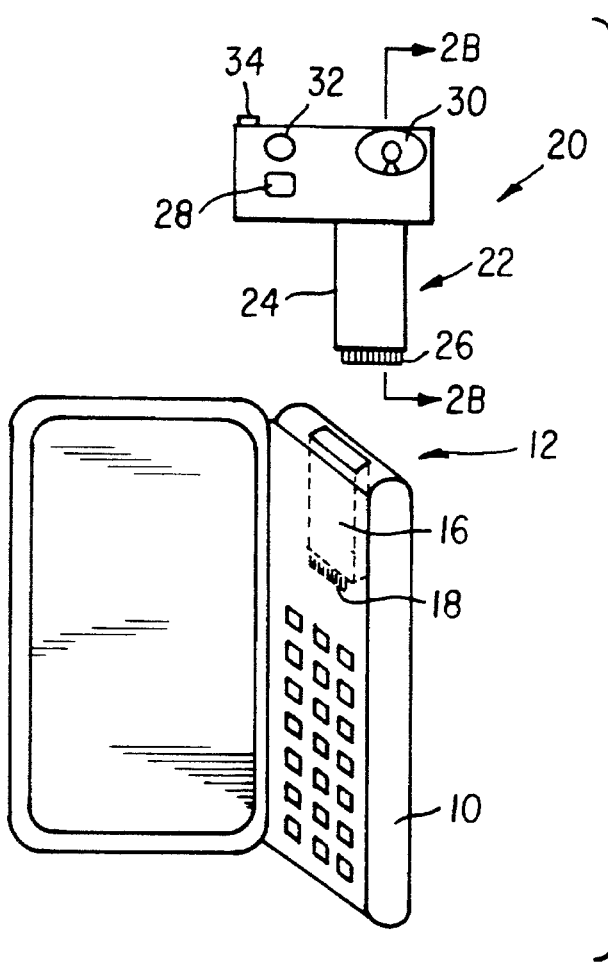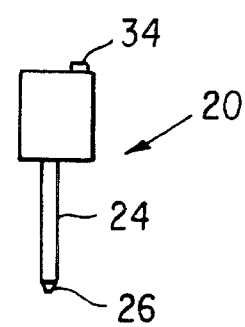
FIG. 2B
FIG. 2A

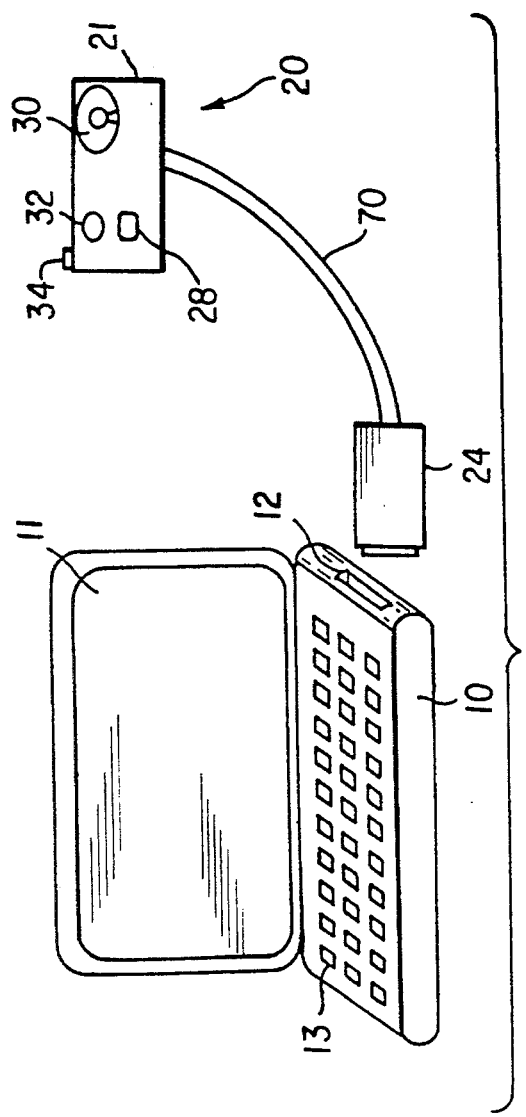
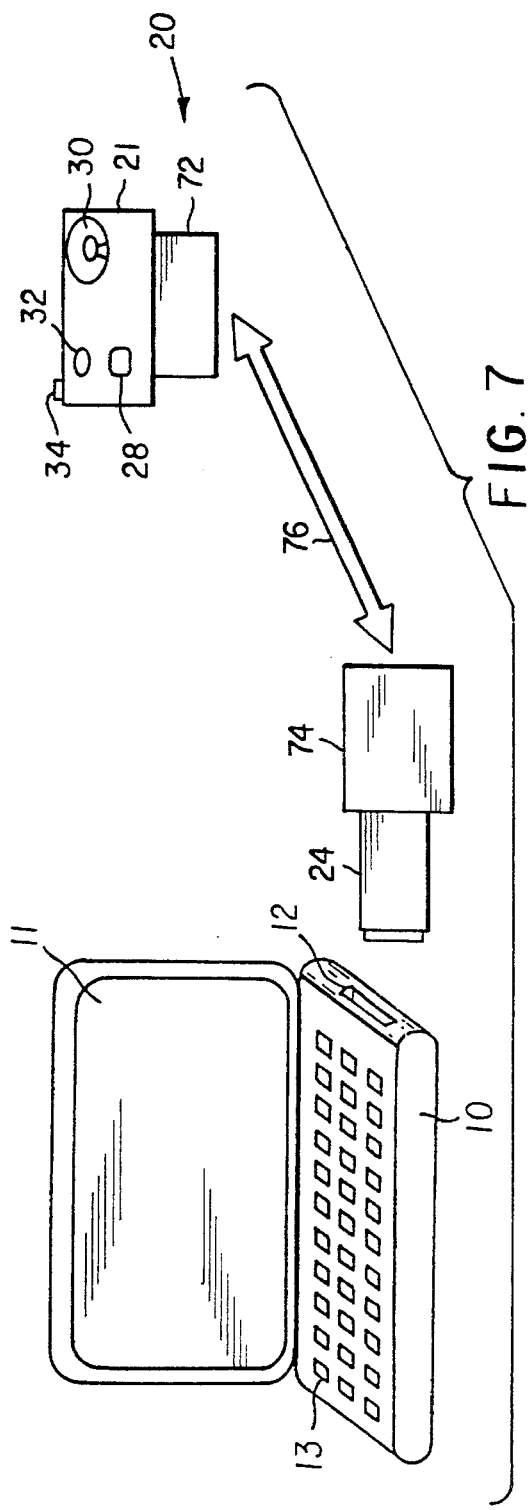

ELECTRONIC CAMERA WITH MEMORY CARD INTERFACE TO A COMPUTER

FIELD OF THE INVENTION

This invention pertains to the field of electronic imaging and, more particularly, to an image acquisition peripheral operated as an input device to a personal computer.

BACKGROUND OF THE INVENTION

It is well known to use a video camera with a computer frame grabber. A typical system employs a video motion camera (such as the CCD 4000 RGB Flash-Sync Camera manufactured by Eastman Kodak Co., Rochester, N.Y.) and a frame grabber board (such as a TARGA™ frame store board manufactured by True Vision, Inc., Indianapolis, Ind.) attached to the PC bus of a personal computer. The camera provides the timing to interface with the video frame store board by activating the frame acquire line of the frame store board whenever an external voltage input to the camera is dropped low (e.g., by dropping the "Camera Acquire In" line to the CCD 4000 camera). It is customary to design software to activate the camera's frame acquire line from the computer. To capture an image into the computer in such a customary application, the operator frames the subject while observing the live camera output on a video monitor, and then interacts with the computer keyboard at the proper moment.

Another approach to computer image acquisition is described in U.S. Ser. No. 805,220, entitled "Hand-Manipulated Electronic Camera Tethered to a Personal Computer," which was filed Dec. 11, 1991 in the names of K. A. Parulski, R. H. Hamel, and J. J. Acello, and assigned to the assignee of the present application. In this system an electronic camera is coupled to a personal computer through a computer interface. In particular, a digital interface standard may be used, and images from the camera are input to the computer through a Small Computer System Interface (SCSI). The camera is preferably linked, or tethered, to the computer with a cable, thus allowing a certain amount of mobility for the camera independent of the computer.

Both of these known interfaces have drawbacks. The NTSC signal is an analog signal subject to noise, and additionally requires a special frame grabber card in the computer to decode and digitize the signal. The SCSI signal has a relatively low data rate and a complicated protocol, requiring an expensive SCSI interface integrated circuit in the camera. Notwithstanding such drawbacks, the system described in Ser. No. 805,220 provides a low cost electronic still camera which attaches to a personal computer that provides image processing, storage, and display. By relying on the computer to perform these tasks, the camera cost can be greatly reduced.

It is known to provide detachable integrated circuit memory in the size and form of a thin card, much like a credit card, that is connectable to a memory card reader which interfaces to a host data processing system via a standard interface, such as the SCSI interface. A typical general-purpose host system, such as a desktop computer, incorporates a processor for utilizing data recorded on the memory card in a variety of applications; a typical specialized host system, e.g., an image capture processing system, provides large volumes of digital data for rapid recording on the card. Newer, smaller, battery-operated personal computers (such as notebook or penpad personal computers) utilize a memory card controller (such as the MB86301 Memory Card Controller, by Fujitsu Microelectronics, Inc.) that is compatible with the Personal Computer Memory Card International Association (PCMCIA) standard. Such a controller is capable of interfacing a variety of memory cards, with densities up to 64 Mbytes, to a wide range of microprocessors via 8- or 16-bit data paths. A typical application is shown in FIG. 1, where a small, battery-operated computer 10 includes a card receptacle 12 for accepting a memory card 14. These computers are often ergonomically designed so that the display screen 11 folds over the keyboard 13, making a very compact package. In such a computer the memory card 14 takes the place of a floppy disk drive. Such small computers often have an RS-232 input port 15, but seldom have either a SCSI port or a dedicated video input port. Images can be input via the RS-232 port 15, but this is a very slow process.

A memory card may also be used as the removable storage medium for recording images taken by an electronic still camera. An example of such a system is shown in U.S. Pat. No. 5,016,107, wherein an image sensor generates analog image information that is converted into digital signals, transformed, and encoded into a compressed stream of digital signals that are downloaded to a removable memory card. The memory card disclosed therein includes a commercially-available high speed static random access memory (SRAM). In another configuration of interest, which is shown in U.S. Pat. No. 4,937,676, a compact, handheld portable electronic imaging system includes both an electronic imaging camera and a hard copy printer (and display) that are separately housed with respect to each other yet readily interconnectable for use either in combination or apart. The camera and printer interconnect by means of an elongated tongue member on the printer housing that slides into a recessed groove in the camera housing. Electrical connectors in the tongue-groove interface convey image signals between the camera and the printer. In addition to the tongue-groove interface between the camera and the printer, slots are provided on the respective units to accept memory cards for separate storage and retrieval of the image signals.

In all of these systems, there is need for a low cost means of digitally interfacing a small camera peripheral to a portable computer at a rate higher than that provided by a SCSI interface or an RS-232 input, and without the attendant difficulties of an analog frame grabbing process.

SUMMARY OF THE INVENTION

An object of the invention is to adapt an available, convenient, high speed interface on a small, portable computer to an electronic camera.

In accordance with the invention, an electronic camera operates with a computer having a card interface of the type used for communicating with a removable card containing semiconductor memory. For this purpose, the camera includes means for converting an image into an electrical signal, means for converting the electrical signal into a digital signal, and means for interfacing the digital signal to the card interface on the computer. By further defining the interfacing means to include a mechanical adaptor that physically interconnects the camera to a card slot on a portable computer, the structural connection links the camera and computer together as a hand-held unit. In a preferred embodiment, the card interface incorporates the PCMCIA standard.

The advantage of the invention is that the camera can be designed as an inexpensive "clip-on" accessory that mates with a portable computer incorporating a PCMCIA "memory card" slot. The computer can be thus relied upon to perform image processing, storage, and display. The PCMCIA interface provides a high speed parallel interface for rapidly transferring image data from an image sensor to a personal computer.

BRIEF DESCRIPTION OF THE DRAWINGS

The invention will be described in relation to the drawings in which

FIG. 1 is an illustration of a known computer adapted for use with a memory card;

FIG. 2A is an illustration of an electronic still camera adapted for insertion into the card slot of a computer in accordance with the invention;

FIG. 2B is a side elevation of the camera of FIG. 2A taken along the lines 2B—2B;

FIG. 6 is a second embodiment of an electronic still camera employing a card interface; and FIG. 7 is a third embodiment of an electronic still camera employing a card interface.

DESCRIPTION OF THE PREFERRED EMBODIMENTS

Figure 3:
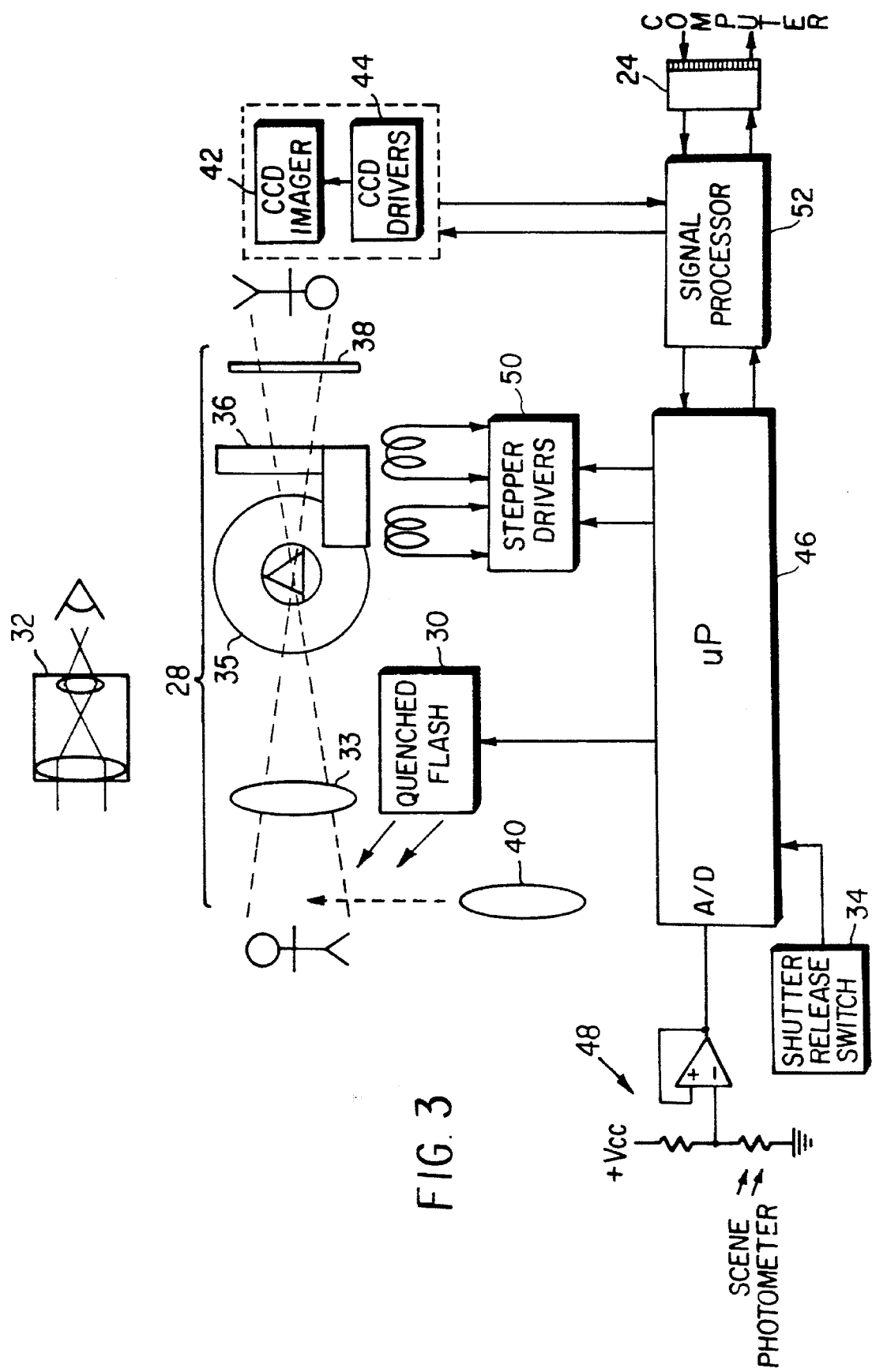
FIG. 3 is block diagram of the major elements of the camera of FIG. 2A.

Since electronic still cameras and computers, including small computers utilizing a card slot adapted to a PCMCIA standard, are well known, the present description will be directed in particular to elements forming part of, or cooperating more directly with, apparatus in accordance with the present invention. Elements not specifically shown or described may be selected from those known in the art. In particular, information as to a typical card interface standard can be found in the *PC Card Standard, Release* 2.0, published by the Personal Computer Memory Card International Association, Sunnyvale, Calif. September 1991.

Referring to FIG. 2, and in accordance with one embodiment of the invention, an electronic camera 20 incorporates a structural element 22 which allows the camera 20 to be connected into the conventional memory card receptacle 12 of a portable computer 10. The receptacle 12 is, e.g., a slot 16 for receipt of a card containing semiconductor memory and the structural element 22, in that case, is an extender board 24 that fits into the slot 16 (shown in phantom lines). The extender 24 includes an edge connector 26 that is configured to mate with a corresponding connector 18 (shown in phantom lines) within the slot 16 when the camera 20 is properly located in relation to the computer 10. (While not critical to the invention, the extender board 24 can be removable from the camera 20, or can be folded into or parallel to the camera 20 when detached from the computer 10.)

Preferably, the card interface is the PCMCIA memory card interface described in the aforementioned reference. In accordance with the PCMCIA PC Card Standard—Release 2.0, the interface pin assignments are as follows (Table I):

TABLE I

PCMCIA PC CARD STANDARD - RELEASE 2.0 PIN ASSIGNMENTS

| PIN | SIGNAL | I/O | FUNCTION |
|---|---|---|---|
| 1 | GND | | Ground |
| 2 | D3 | I/O | Data bit 3 |
| 3 | D4 | I/O | Data bit 4 |
| 4 | D5 | I/O | Data bit 5 |
| 5 | D6 | I/O | Data bit 6 |
| 6 | D7 | I/O | Data bit 7 |
| 7 | CE1 | I | Card enable |
| 8 | A10 | I | Address bit 10 |
| 9 | OE | I | Output enable |
| 10 | A11 | I | Address bit 11 |
| 11 | A9 | I | Address bit 9 |
| 12 | A8 | I | Address bit 8 |
| 13 | A13 | I | Address bit 13 |
| 14 | A14 | I | Address bit 14 |
| 15 | WE/PGM | I | Write enable |
| 16 | IREQ | O | Interrupt Request |
| 17 | Vcc | | |
| 18 | Vpp1 | | Programming and Peripheral Supply |
| 19 | A16 | I | Address bit 16 |
| 20 | A15 | I | Address bit 15 |
| 21 | A12 | I | Address bit 12 |
| 22 | A7 | I | Address bit 7 |
| 23 | A6 | I | Address bit 6 |
| 24 | A5 | I | Address bit 5 |
| 25 | A4 | I | Address bit 4 |
| 26 | A3 | I | Address bit 3 |
| 27 | A2 | I | Address bit 2 |
| 28 | A1 | I | Address bit 1 |
| 29 | A0 | I | Address bit 0 |
| 30 | D0 | I/O | Data bit 0 |
| 31 | D1 | I/O | Data bit 1 |
| 32 | D2 | I/O | Data bit 2 |
| 33 | IOIS16 | O | IO Port is 16 bit |
| 34 | GND | | Ground |
| 35 | GND | | Ground |
| 36 | CD1 | O | Card detect |
| 37 | D11 | I/O | Data bit 11 |
| 38 | D12 | I/O | Data bit 12 |
| 39 | D13 | I/O | Data bit 13 |
| 40 | D14 | I/O | Data bit 14 |
| 41 | D15 | I/O | Data bit 15 |
| 42 | CE2 | I | Card enable |
| 43 | RFSH | I | Refresh |
| 44 | IORD | I | IO Read |
| 45 | IOWR | I | IO Write |
| 46 | A17 | I | Address bit 17 |
| 47 | A18 | I | Address bit 18 |
| 48 | A19 | I | Address bit 19 |
| 49 | A20 | I | Address bit 20 |
| 50 | A21 | I | Address bit 21 |
| 51 | Vcc | | |
| 52 | Vpp2 | | Programming and Peripheral Supply 2 |
| 53 | A22 | I | Address bit 22 |
| 54 | A23 | I | Address bit 23 |
| 55 | A24 | I | Address bit 24 |
| 56 | A25 | I | Address bit 25 |
| 57 | RFU | | Reserved |
| 58 | RESET | I | Card Reset |
| 59 | WAIT | O | Extend bus cycle |
| 60 | INPACK | O | Input Port Acknowledge |
| 61 | REG | I | Register select & IO Enable |
| 62 | SPKR | O | Audio Digital Waveform |
| 63 | STSCHG | O | Card Statuses Changed |
| 64 | D8 | I/O | Data bit 8 |
| 65 | D9 | I/O | Data bit 9 |
| 66 | D10 | I/O | Data bit 10 |
| 67 | CD2 | O | Card detect |
| 68 | GND | | Ground |

The camera 20 is thus connected into the 68 pin PCMCIA memory card slot 16 of the portable computer 10 by means of an extender board 24 that matches PCMCIA card dimensions. The full PCMCIA dimensions are available in the aforementioned Release 2.0; basically, the card is approximately 86 mm long by 54 mm wide by 4 mm thick. The card slot 16 is dimensioned accordingly. The camera 10 is designed to respond to commands from the portable computer 10 using the normal PCMCIA address and control lines, and to provide image data to the computer 10 over the normal PCMCIA data lines, as shown in Table I. The camera includes memory which defines the "card" as a "camera", and can optionally store the compiled software code for the computer 10 to execute in order to properly process images from the camera 20. One advantage of the invention is that the camera can be designed as an inexpensive accessory to the computer, with a minimum of external components. In FIG. 2A, the camera 20 is shown with an optical system 28, a flash unit 30, a view finder 32, and a capture switch 34. As shown in side elevation in FIG. 2B, the camera 20 can be made to have a relatively thin configuration that ergonomically mates with the computer 10. In this manner the computer 10 and camera 20 interconnect via the PCMCIA card slot 16 to form a convenient hand-held unit for taking pictures.

FIG. 3 shows the subsystems of the camera 10. The optical system 28 includes a lens 33, a diaphragm 35, a shutter 36, and an infrared filter 38. To keep the system inexpensive, the lens 33 is fixed focus, and a close-up diopter lens 40 is optionally moved into the optical axis for close-up pictures. Image light is directed by the optical system 28 upon an image sensor 42, which is a charge-coupled device (CCD) sensor, such as the full frame sensor KAF-400 manufactured by Eastman Kodak Company, Rochester, N.Y. The timing of the read-out of the image sensor 42 is controlled by a CCD clock driver circuit 44.

The sub-systems of the camera 20 are controlled by a microprocessor 46. In particular, the exposure conditions of the image are input to the microprocessor 46 from a photometer 48 and shutter release is initiated by the capture switch 34. Accordingly, the microprocessor 46 instructs a pair of stepper drivers 50 to set the diaphragm 35 and to operate the shutter 36, and, as needed, to fire the flash 30. The microprocessor 46 further interfaces with a signal processor 52, which controls the read-out clocking of the image sensor 42 and processes the image signal generated by the image sensor 42. The signal processor 52 provides the processed image signals to the computer 10 via the extender 24.

Figure 4:
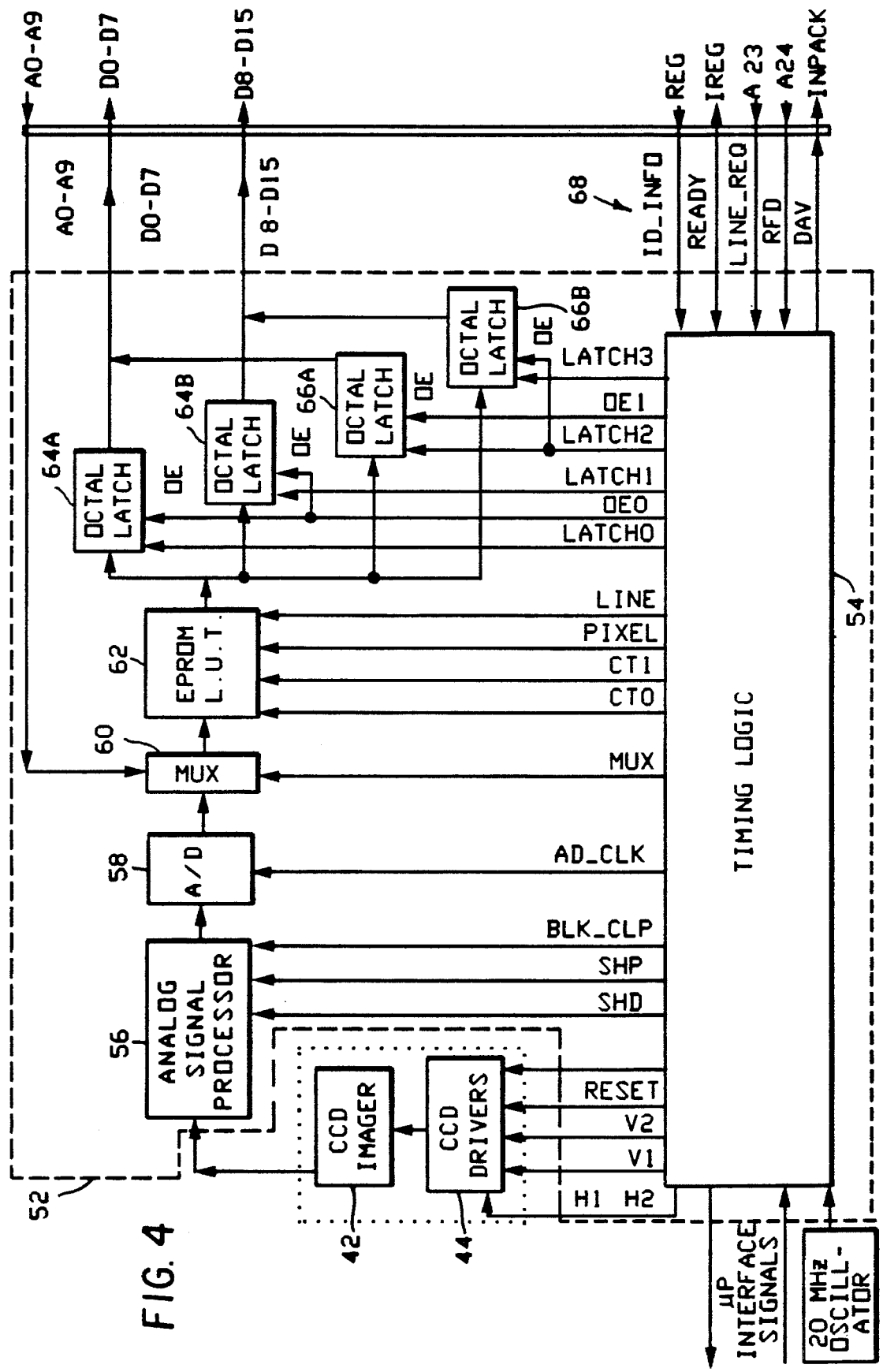
FIG. 4 is a more detailed diagram of the signal processor shown in FIG. 3.

Details of the signal processor 52 are shown in FIG. 4. A logic circuit 54 (such as Model EPS464 or Model EPM7096 integrated circuits manufactured by Altera Corp., San Jose, Calif.) provides the timing signals to control the image sensor 42 and the various parts of the signal processor 52. In particular the logic circuit 54 provides the horizontal and vertical clocking signals H1, H2, V1, V2 to read an image signal from the sensor 42 and the timing signal RESET to initiate each pixel read-out period. The output of the sensor 42 is initially processed by an analog signal processor 56 incorporating, e.g., a gain stage and a correlated double sampling circuit, and converted to a digital signal by an analog-to-digital (A/D) converter 58. The digitized signal is then processed by an EPROM look-up table (LUT) 62 that is addressed by a multiplexer 60. The LUT 62 stores the white balance and gamma correction curveshapes, and information about the camera. More particularly, the LUT 62 may store the Card Information Structure (CIS) required by the PCMCIA format (refer to the aforementioned PCMCIA standard reference), which indicates that the computer is accessing a special type of "memory card", specifically, a "camera". The LUT can also store a camera serial number, location of sensor defects, the structure of a color filter array used on the sensor 42, etc. Moreover, the LUT 62 may also store the computer program which is used (by the computer) to operate the camera and to process the images from the sensor color filter array to obtain a full resolution, color corrected image. This information is read from EPROM 62 when the REG pin on the PCMCIA connector is enabled, causing the timing logic 54 to switch the MUX60 output to respond to address pins A0–A9 on the PCMCIA connector.

The digitized signal processed by the LUT 62 is then provided to two sets of octal latches, 64a, 64b, and 66a, 66b. Each octal latch stores one pixel value. While one set (64a, 64b or 66a, 66b) of latches is being loaded, the pixel values stored in the other set from the previous two pixels are read into the computer 10 through the 16-bit data lines D0–D15 via the PCMCIA bus. The camera 20 is controlled by the address lines A0–A9 and the control lines 68 from the computer 10 provided via the PCMCIA bus. In addition to the already-mentioned REG pin, which is used to initiate a readout of information from the LUT 62, the IREQ line receives a signal from the timing logic 54 when data is available for transfer, and address bit 23 (A23 pin) is set by the computer to trigger the timing logic 54 to begin a line transfer. As each pair of pixels are latched into the octal latches 64a, 64b, 66a, and 66b, the timing logic 54 indicates that valid data is available by asserting the INPACK pin. After the computer has read the two pixel values, it asserts address bit 24 (A24 pin) to alert the timing logic 54 that the computer is ready for another two pixels. This two-pixel by two-pixel "hand shaking" continues until the full line is transferred, and the process then repeats for the next line.

Figure 5:
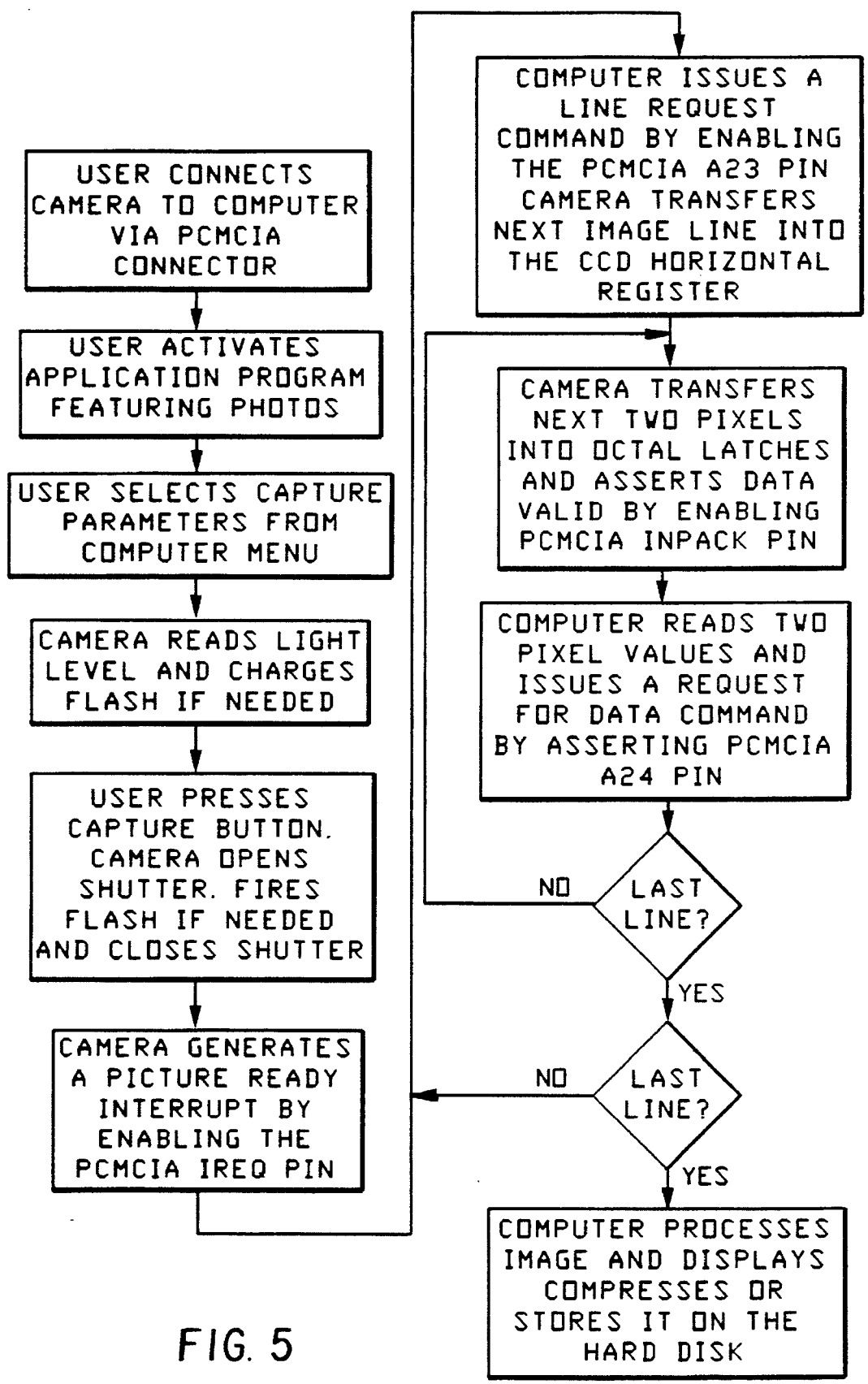
FIG. 5 is a flow chart showing the operation of the electronic still camera shown in the aforementioned Figures.

The operation of the image capture system of FIGS. 2-4 proceeds as shown in the flow chart of FIG. 5. The user begins by connecting the extender card 24 incorporating the PCMCIA socket 26 to the camera, and sliding the extender card 24 into the computer. The user opens a "camera" application program and selects capture parameters from a menu. The options can include color (8, 16, or 24 bit) or monochrome (1 or 8 bit), full resolution or subsampled, and store direct to disk, compress before storing, or convert to a standard metric before storing. Once the selections are made, the camera 20 is "enabled" and the flash is charged if required. The user frames the image and depresses the capture button 34. This action initiates a sequence in which the scene light level is read using the photometer 48, the diaphragm 35 is adjusted, the shutter 36 is opened, the flash 30 is fired if necessary, and the image sensor 42 is exposed to light. The digitized image sensor data, a line at a time, is read over the PCMCIA bus to the computer RAM memory using the sequence shown in FIG. 5. Depending on the capture options selected, the data is either stored directly from RAM to the hard disk (or other non-volatile computer memory), is compressed using conventional methods, or converted to a full resolution color image.

In a second embodiment shown in FIG. 6, the camera 20 includes an enclosure 21 connected to the extender board 24 via a flexible multi-wire cable 70 (the enclosure 21 includes the elements of FIG. 4 less the extender board 24.) The extender board 24 plugs into the PCMCIA slot 12 in the computer 10. The cable 70 allows the camera 20 to be used some distance from the computer. The multi-wire cable may include only a subset of the pin connections listed in table 1, since pins not used by the camera 20 do not need to be included in the cable 70. To further reduce the number of wires required, the cable could use a serial data format, and the serial data could be converted to parallel data on the extender board 24.

In a third embodiment shown in FIG. 7, the camera 20 includes a radio frequency (RF) element 72 having an RF transmitter and an RF receiver connected to the enclosure 21, and the extender board 24, which plugs into the PCMCIA slot 12 in the computer 10, also includes an RF element 74 having an RF transmitter and receiver. The digital image is transferred from the camera 20 to the computer 10 via an RF link 76, which is shown schematically by an arrow. Alternately, an infrared (IR) transmission link could be used, and the elements 72 and 74 would constitute respective sets of infrared (IR) emitters and receivers.

The invention has been described in detail with particular reference to a presently preferred embodiment, but it will be understood that variations and modifications can be effected within the spirit and scope of the invention. For example, in another embodiment, the camera 20 could supply data using only 8 bits out of the 16 data bits available on the PCMCIA connector. In yet another embodiment, a buffer memory may be inserted between the LUT 62 and the PCMCIA connector so that the data transfer to the computer 10 can take place at any time following the image capture, without being synchronized to the sensor readout.

What is claimed is:

1. An electronic camera system comprising:

a computer having a card interface slot of the type used for communicating with a removable card containing a semiconductor memory, wherein the card interface slot includes an internal connector;

a camera including means for converting an image into an electrical signal, means for converting the electrical signal into a digital signal, and interfacing means for interfacing the digital signal to the internal connector of the card interface slot of the computer;

wherein the interfacing means includes a structural element that fits into the card interface slot of the computer, and physically connects to the internal connector to provide a link for transferring the digital signal from the camera to the computer; and wherein the card interface slot is a PCMCIA interface slot wherein said image converting means and said signal coverting means are contained within an enclosure, and wherein said interfacing means further includes a cable for connecting said structural element to said enclosure.

2. A camera system as claimed in claim 1 wherein the computer is portable and the structural element connects the computer an camera together as a hand-held unit.

3. An electronic camera for operation with a computer having a card slot for interfacing with a removable memory card, said camera comprising:

an optical system for forming an image of a scene;

an image sensor for converting the image into an electrical signal;

an A/D converter for generating a digital signal from the electrical signal;

a signal processor for generating a processed digital signal from the digital signal; and an adaptor for conveying the processed digital signal through the card slot to the computer;

wherein the adaptor includes an extender board dimensioned to fit into the card slot of the computer and a connector for physically connecting the adaptor to the card slot, wherein the adaptor provides a link for transferring the processed digital signal from the camera to the computer, wherein the card slot and said adaptor use a PCMCIA standard electrical interface specification and wherein said image converting means and said signal converting means are contained within an enclosure, and wherein said interfacing means further includes a cable for connecting said structural element to said enclosure.

4. An electronic camera as claimed in claim 3 wherein said signal processor provides gamma correction and/or white balancing.

5. An electronic camera as claimed in claim 3 wherein said signal processor is a look-up memory having a transfer function that provides gamma correction and/or white balancing.

6. An electronic camera as claimed in claim 5 wherein said look-up memory also stores information concerning the camera, such as the camera serial number, or a sensor defect map.

7. An electronic camera as claimed in claim 6 wherein said look-up table contains software utilizable by the computer for processing the images.

8. An electronic camera as claimed in claim 3 wherein said extender board supports the camera against a side of the computer having the card slot.

9. An electronic camera as claimed in claim 3 wherein said extender board is removable from the camera.

10. An electronic camera as claimed in claim 3 wherein said extender board may be folded along a side of the camera.

* * * * *

UNITED STATES PATENT AND TRADEMARK OFFICE
CERTIFICATE OF CORRECTION

PATENT NO. : 5,475,441
DATED : December 12, 1995
INVENTOR(S) : K Parulski, et al It is certified that error appears in the above-identified patent and that said Letters Patent is hereby corrected as shown below:

| | |
|---|---|
| Column 7, line 26 | after "connector;" please insert --and--. |
| Column 7, line 34, | after "puter", delete ",". |
| Column 7, line 36 | after "computer", please delete "; and" and substitute --,--. |
| Column 7, line 37 | Insert --,-- after "slot" (second occurrence) -- |
| Column 8, line 18 | After "specification", delete "and". |
| Colunn 8, line 18 | Delete "converting means" and subsitute with --sensor--. |
| Colunn 8, line 19 | Delete "signal converting means" and substitute with --A/D converter--. |
| Column 8, line 20 | Delete "interfacing means" and substitute with --adaptor--. |
| Column 8, lines 21 & 22 | Delete "structural element" and substitute with --extender board--. |

Signed and Sealed this

Sixteenth Day of March, 1999

Attest:

Q. TODD DICKINSON

*Attesting Officer*    *Acting Commissioner of Patents and Trademarks*